(12) United States Patent
Dizdarevic et al.

(10) Patent No.: US 10,433,120 B2
(45) Date of Patent: Oct. 1, 2019

(54) NETWORK BROADCAST OF DATA TO INTERNET OF THINGS (IOT) DEVICES USING A DEDICATED SYSTEM INFORMATION BLOCK (SIB) IN LONG TERM EVOLUTION (LTE) AND/OR FIFTH GENERATION (5G) NEXT RADIO NETWORKS

(71) Applicants: AT&T INTELLECTUAL PROPERTY I, L.P., Atlanta, GA (US); AT&T Mobility II LLC, Atlanta, GA (US)

(72) Inventors: Jasminka Dizdarevic, Austin, TX (US); Murali Narayanan, Redmond, WA (US); DeWayne A. Sennett, Redmond, WA (US); Thomas Becker, Atlanta, GA (US); Ye Chen, Milton, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 15/625,508

(22) Filed: Jun. 16, 2017

(65) Prior Publication Data
US 2018/0367958 A1 Dec. 20, 2018

(51) Int. Cl.
*H04W 4/08* (2009.01)
*H04W 4/04* (2009.01)
(Continued)

(52) U.S. Cl.
CPC ........ *H04W 4/08* (2013.01); *G08G 1/096708* (2013.01); *G08G 1/096791* (2013.01);
(Continued)

(58) Field of Classification Search
CPC ........ H04W 4/08; H04W 4/70; H04W 4/046; H04W 84/042; G08G 1/096791; G08G 1/096708
See application file for complete search history.

(56) References Cited

U.S. PATENT DOCUMENTS 9,363,827 B2  6/2016 Li et al.
9,408,052 B2  8/2016 Drapkin et al.
(Continued)

OTHER PUBLICATIONS

"U.S. DOT advances deployment of Connected Vehicle Technology to prevent hundreds of thousands of crashes" Dec. 13, 2016, published online at [https://www.nhtsa.gov/press-releases/us-dot-advances-deployment-connected-vehicle-technology-prevent-hundreds-thousands], retrieved on Feb. 3, 2018, 4 pages.
(Continued)

*Primary Examiner* — Dady Chery
(74) *Attorney, Agent, or Firm* — Amin, Turocy & Watson, LLP

(57) ABSTRACT

A system information block (SIB) in a radio interface is dedicated to broadcast data intended for Internet of things (IoT) devices. The data can be associated with most any IoT service, such as but not limited to, a vehicle-to-vehicle (V2V) and/or vehicle-to-everything (V2X) service. In one aspect, data, associated with an event, that has been aggregated from one or more IoT devices located within a region can be analyzed to determine a geographical area where a message regarding the event (e.g., accident) is to be broadcast. Further, the message can be dynamically prioritized and/or customized to target a particular class of IoT devices (e.g., connected cars) by employing different message identifiers.

20 Claims, 12 Drawing Sheets

(51) Int. Cl.
*G08G 1/0967* (2006.01)
*H04W 4/70* (2018.01)
*H04W 84/04* (2009.01)

(52) U.S. Cl.
CPC ............ *H04W 4/046* (2013.01); *H04W 4/70* (2018.02); *H04W 84/042* (2013.01)

(56) References Cited

U.S. PATENT DOCUMENTS

| | | |
|---|---|---|
| 9,445,421 B2 | 9/2016 | Levine et al. |
| 9,510,173 B2 | 11/2016 | Cai et al. |
| 2015/0147995 A1 | 5/2015 | Bontu et al. |
| 2015/0195827 A1 | 7/2015 | Feng et al. |
| 2015/0365809 A1 | 12/2015 | Lemberg et al. |
| 2016/0105908 A1* | 4/2016 | Li .................... H04W 4/70 370/329 |
| 2016/0127439 A1 | 5/2016 | Ginnela et al. |
| 2016/0285935 A1* | 9/2016 | Wu .................... H04W 4/90 |
| 2016/0295624 A1* | 10/2016 | Novlan ............... H04W 76/14 |
| 2017/0086028 A1 | 3/2017 | Hwang et al. |
| 2017/0245245 A1* | 8/2017 | Kim ................ H04W 72/1284 |
| 2018/0213365 A1* | 7/2018 | Yi .................... H04W 4/06 |

OTHER PUBLICATIONS

"CMAS Via EPS Public Warning System Specification" ATIS-0700010, 2010, 37 pages.
"3rd Generation Partnership Project; Technical Specification Group Radio Access Network; Evolved Universal Terrestrial Radio Access (E-UTRA); Radio Resource Control (RRC); Protocol specification (Release 14)" 3GPP TS 36.331 V14.0.0, Sep. 2016, 643 pages.

\* cited by examiner

NETWORK BROADCAST OF DATA TO INTERNET OF THINGS (IOT) DEVICES USING A DEDICATED SYSTEM INFORMATION BLOCK (SIB) IN LONG TERM EVOLUTION (LTE) AND/OR FIFTH GENERATION (5G) NEXT RADIO NETWORKS

TECHNICAL FIELD

The subject disclosure relates to wireless communications, e.g., to a network broadcast of data to Internet of things (IoT) devices using a dedicated SystemInformationBlock (SIB) in long term evolution (LTE) and/or fifth generation (5G) next radio (NR) networks (e.g., as well as to other next generation radio networks).

BACKGROUND

With a rapid increase in wireless network resources, automobile manufacturers are working towards a connected car that takes advantage of high network data speeds to provide users with various services, such as, voice-controlled applications, infotainment, and/or diagnostics. A connected car is a car that is equipped with wireless internet access. As an example, connected cars can be coupled to the Internet via network devices of most any communication network (e.g., cellular network, WiFi network, satellite communication network, etc.). Further, connected cars can be directly coupled to each other to enable additional benefits to the driver. Examples include automatic notification of crashes, notification of speeding and safety alerts, etc.

The above-described background relating to connected vehicles is merely intended to provide a contextual overview of some current issues, and is not intended to be exhaustive. Other contextual information may become further apparent upon review of the following detailed description.

DETAILED DESCRIPTION

Figure 1:
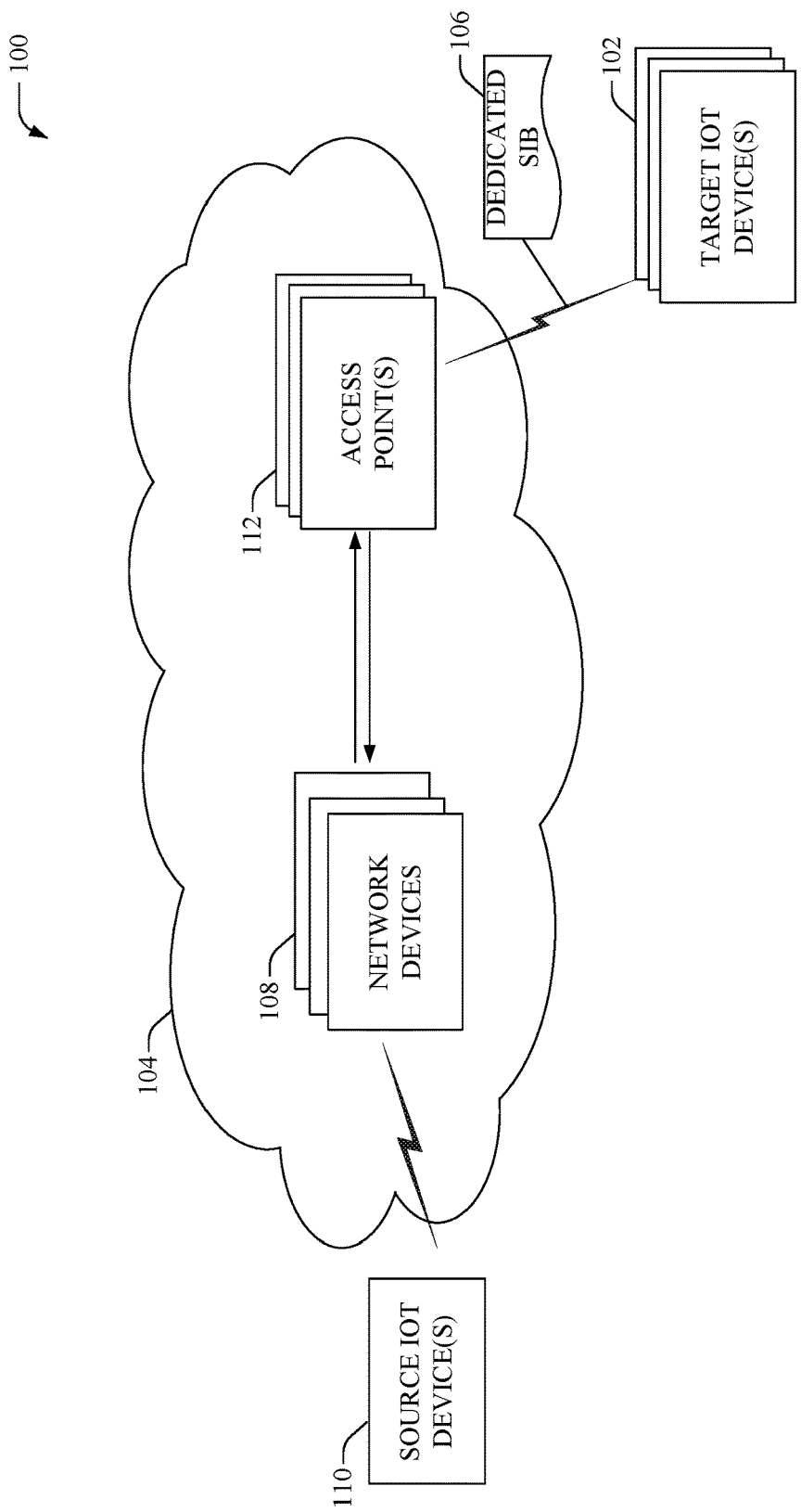
FIG. 1 illustrates an example system that facilitates data broadcast to IoT devices.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile station," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Furthermore, the terms "user," "subscriber," "consumer," "driver," "occupant," "passenger," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

By way of further context, vehicle-to-vehicle (V2V) technology is a crash avoidance technology that relies on communication of information between nearby vehicles to warn drivers about potentially dangerous situations that can lead to accidents. The National Highway Traffic Safety Administration (NHTSA) has issued a Notice of Proposed Rulemaking for V2V communication services that proposes a requirement for utilizing V2V technology in all new light-duty vehicles. Conventional systems employ a dedicated short-range communications (DSRC) technology to facilitate the V2V communication. This short-range technology allows a car to exchange information with another car that is typically within a 300-meter radius. To enable communications with cars that are beyond 300 meters, other conventional systems utilize LTE standard multimedia multicast technology. This employs a 3GPP standard for broadcast on the mobile networks called evolved multimedia broadcast multicast service (eMBMS). The eMBMS technology comes with its own set of challenges. Specifically, it is only well suited for broadcasts of delivering content in larger predefined geographical areas such as specific venues, and cities. This is because the multicast broadcast single frequency network (MBSFN) area, which is an area of eNodeBs (eNBs) from which the same eMBMS content can be synchronously transmitted, has to be statically pre-provisioned. There is also a limit on the number of MBSFN areas to which a single cell sector can belong. As such, it is not practical to use this technology to transmit broadcast in the individual eNB cells, or in a group of just a few cells, which is most often the case for the V2V services.

Another solution to enable communications between cars that are beyond 300 meters can comprise utilizing single cell point-to-multipoint (SC-PTM) technology. However, this technology is new and not yet available on the market. It is still uncertain as to how much time it is going to take before this technology is implemented by the RAN vendors, and the chipset vendors. As such, it may not be a suitable option to meet the required timeline for the initial V2V deployments. Additionally, both eMBMS and SC-PTM require significant investments in the core (and/or RAN) network upgrades.

Traditionally, cars have served a single purpose of transportation of people and goods. The replacement of traditional cars by connected cars facilitates functionality beyond mere transportation. Specifically, the functionality provides for a wide range of opportunity for automated vehicles, including wireless communication of information to Internet of things devices. IoT is a vast and growing universe of devices that includes vehicles, smart city devices (e.g., parking meters, traffic lights, etc.), medical devices, industrial systems, utility devices, and a variety of consumer electronics devices. Oftentimes IoT devices are to be provided with the same data simultaneously (or substantially simultaneously) in order to perform operations. For example, a vehicle-to-vehicle (V2V) communication service and/or a vehicle-to-everything (V2X) communication service, relies on communication of information between nearby vehicles and/or other IoT devices to warn drivers about potentially dangerous situations that could lead to unsafe driving conditions or accidents. In one aspect, a cellular mobility network can be leveraged to facilitate the communication of the information. For example, the information can be broadcasted to devices within an area (e.g., nationwide or within a particular state) via a SystemInformationBlock 12 (SIB 12) over a broadcast control channel (BCCH) signaling control channel. The SIB 12 shares the BCCH signaling control channel with RAN control functions and the SIB 12 is traditionally utilized to broadcast wireless emergency alerts (WEA) service alerts to mobile phones within the area. However, the 3GPP specification has designated SIB 12 to be used for the WEA service broadcasts alerts to the mobile phones.

Sharing the SIB 12 with V2V/V2X service communication can result in various issues related to complexities involved with a regulatory requirement for wireless operators to provide a network solution that prioritizes WEA traffic over any other traffic that uses the same network channel. Additionally, transmitting V2V/V2X notifications over SIB 12 can cause smart phones (e.g., category 3/4 devices) to frequently wake up (e.g., from an idle or sleep mode) and read the notifications that are intended for IoT devices (e.g., category M devices). This can lead to significant power consumption and battery drainage. Further, since the WEA and IoT services do not share the same latency requirements using a common SIB for both services would not make it possible to meet these different requirements.

Systems and methods disclosed herein relate to a new SIB (e.g. SIB 20) in the LTE U-u radio interface that is dedicated to broadcast data that targets the IoT devices. The data can be associated with most any service, such as but not limited to a V2V and/or V2X service, for which the IoT devices consume relatively small amounts of data sent by the network. Further, in one aspect, the broadcast data can be dynamically prioritized and/or created to target particular type of IoT device (e.g., cars) based on using different message identifiers.

Referring initially to FIG. 1, there illustrated is an example system 100 that facilitates data broadcast to IoT devices, according to one or more aspects of the disclosed subject matter. In one aspect, system 100 can be utilized for transferring alerts and/or notifications to a group of target IoT devices 102 within select sectors of a communication network 104 (e.g., mobility network) via one or more new SIBs that have been designated for transfer of the IoT service data.

According to an aspect, network devices 108 of the communication network 104 can collect event data from one or more source IoT devices 110 (via a push or pull configuration) located within an area. As an example, an event can comprise but is not limited to error conditions, accident-related data, vehicle operation data, sensor data, malfunction related data, etc. In one aspect, the network devices 108 can analyze the received event data to determine a type of event (e.g., traffic jam, car crash, pothole, debris on the road, etc.). Additionally or optionally, the network devices can employ context data (e.g., weather conditions, news, scheduled event information, etc.) related to the area received from network and/or third party servers (not shown) to determine the type of event and/or a priority associated with the event. Based on the type of event, the network devices 108 can determine a geographical area (e.g., and the size thereof) wherein an alert/notification for the event is to be broadcasted. As an example, a larger area can be selected for an event with a higher priority or severity (e.g., multiple car accident) than an event with a lower priority or severity (e.g., a fender bender). In one aspect, the event alerts/notification can be broadcasted in smaller regions that are localized to the event (e.g., 1-3 cell sectors). Further, the network devices 108 can select a class of target IoT devices 102 within the selected area that are intended to process/utilize the alert/notification. For example, the network devices 108 can determine different alerts to be sent to different types/classes of target IoT devices 102 (e.g., send alert 1 to connected cars within the area, send alert 2 to smart traffic lights within the (same or different) area, send alert 3 to smart parking meters, etc.).

In one embodiment, the network devices 108 can forward the alert/notification to appropriate access points 112 that serve the selected area, which in turn can broadcast the alert/notification via a SIB 106 that is dedicated to transfer IoT service data. As an example, access points 112 can comprise most any base station of a cellular network, such as but not limited to a eNodeB (eNB), a femto access point, a pico station, etc. Various SIBs are utilized in LTE networks and some of them, such as SIB1, carry important network information to help mobile devices perform cell search and selection, in addition to obtaining other important network information to help mobile devices with handovers, cell reselection, etc. As an example, the SIBs are transmitted by the access points 112 over a U-u radio interface in the broadcast control channel (BCCH) logical channel. Typically, BCCH messages are carried on the downlink shared channel (DL-SCH) and transmitted on the physical downlink shared channel (PDSCH). Traditional systems utilize 19 SIBs of the 32 available SIBs defined by the 3GPP for the LTE network for various applications. In one aspect, the access points 112 can utilize a new SIB (e.g., SIB 20) in the LTE U-u radio interface and/or in the 5G-NR radio interface that would specifically carry broadcast data that targets the IoT devices for transmitting relatively infrequent broadcasts of small amounts of data to the target IoT devices 102 in the selected area. Moreover, chipsets within the target IoT devices 102 can be configured to read this new SIB. In one example, chipsets within mobile phones (e.g., category 3/4 devices) can still view this new SIB (as scheduled in the SIB 1) but can be configured to ignore the new SIB data. Accordingly, system 100 can prevent issues with the increased mobile phone battery consumption due to IoT related data broadcasts in the network.

In addition, by employing a new/different SIB for IoT broadcasts and not sharing a SIB that provides WEA, the complexity involved with having to meet a WEA regulatory requirement to always prioritize WEA broadcasts over the other services' broadcasts can be eliminated. Further, due to the complete separation of the SIB blocks used for WEA and IoT broadcasts, wireless network operators can independently tweak the SIB periodicity configuration for these two data broadcasts. Specifically, the SIB periodicity (e.g., the frequency of SIB transmission) can affect broadcast transmission latency and the receiving device's battery consumption. As an example, transmissions that can cause battery drainage are always a concern in mobile phones, but are not as significant a factor that affects the IoT chipsets in connected cars. In another example, V2V service's sensitivity to the data broadcast transmission latency is much higher than for some types of the WEA alerts. Further, as compared to the traditional eMBMS or SC-PTM technology, system 100 does not require significant investments into the core network technology.

According to an embodiment, the IoT broadcasts received via the dedicated SIB 106 can be presented to a user via an output unit (e.g., monitor, heads-up display, speaker, etc.) of and/or coupled to the target IoT devices 102 and/or can be utilized to control one ore more operations of the IoT devices 102 (e.g., apply brakes, reroute the vehicle to avoid the event, etc.). In one aspect, the source IoT devices 110 and/or the target IoT devices 102 are not limited to a connected vehicle and can comprise most any communication device that comprises and/or is coupled to a communication radio. As an example, the source IoT devices 110 and/or the target IoT devices 102 can comprise a subscriber identity module (SIM) that facilitates authentication with the communication network 104. It is noted that source IoT devices 110 and/or the target IoT devices 102 can be mobile, have limited mobility and/or be stationary.

Figure 2:
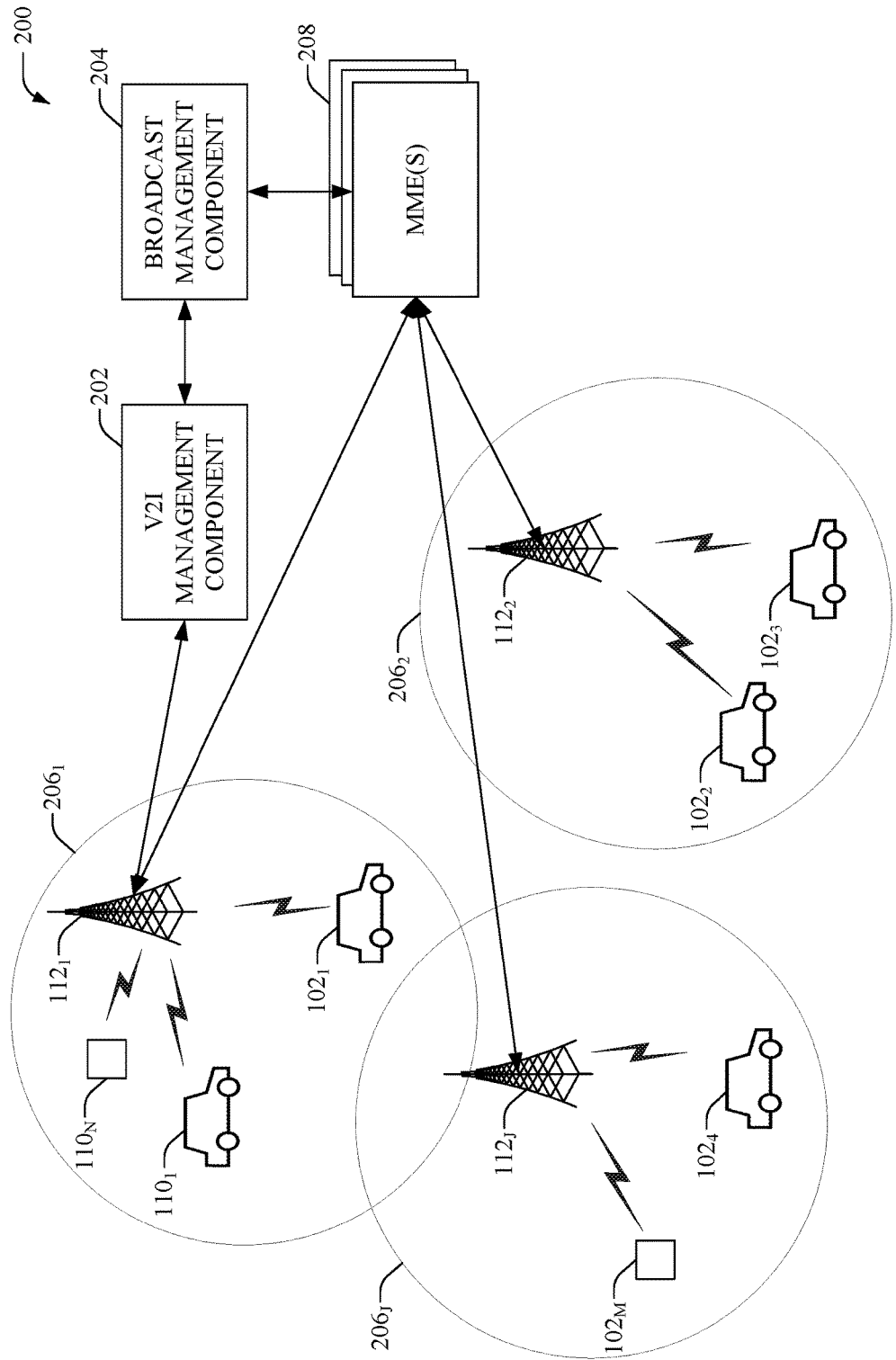
FIG. 2 illustrates an example system for broadcasting event data to specific Internet of things (IoT) devices.

Referring now to FIG. 2, there illustrated is an example system 200 for broadcasting event data to specific IoT devices, in accordance with an aspect of the subject disclosure. It is noted that target IoT devices $102_1$-$102_M$ (wherein M is most any natural number) are substantially similar to target IoT devices 102 and comprise functionality as more fully described herein, for example, as described above with regard to target IoT devices 102. Further, source IoT devices $110_1$-$110_N$ (wherein N is most any natural number) are substantially similar to source IoT devices 110 and comprise functionality as more fully described herein, for example, as described above with regard to source IoT devices 110. Furthermore, access points $112_1$-$112_J$ (wherein J is most any natural number) are substantially similar to access points 112 and comprise functionality as more fully described herein, for example, as described above with regard to access points 112.

According to an aspect, on detecting an event (e.g., an accident, traffic congestion, roadwork, etc.) source IoT devices $110_1$-$110_N$, such as but not limited to, connected vehicles $110_1$, smart devices $110_N$ (e.g., smart traffic lights, connected traffic cameras, speed detectors, toll booth equipment, parking meters, etc.) can inform neighboring vehicles (e.g., that are within 300 meters) using dedicated short-range communications (DSRC) technology and/or most any other short range technology (e.g., PC5 communications specified in 3GPP Rel 14 C-V2X). Additionally or alternatively, the source IoT devices $110_1$-$110_N$ can send a message with event information and/or other measurement data to a vehicle-to-infrastructure (V2I) management component 202 of a communication network (e.g., communication network 104). As an example, the event information can comprise an event description (e.g., accident, traffic, etc.), a timestamp, location data (e.g., based on global positioning system measurements) indicative of a location of the source IoT devices $110_1$-$110_N$, sensor data (e.g., images, text, video, audio, and/or other measurements) collected by sensors of the IoT devices $110_1$-$110_N$, etc. According to an aspect, the V2I management component 202 can aggregate event information from one or more source IoT devices $110_1$-$110_N$ within a defined region (e.g., devices that are located within a defined distance from each other) and analyze the aggregated data to determine whether other nearby IoT devices are to be notified of the event. Additionally or optionally, the V2I management component 202 can collect and utilize external data (e.g., weather data, news, traffic reports, emergency alerts, police scanner data, trending data on social media, etc.) from one or more network and/or third party servers (not shown) to facilitate the determination.

In one example, based on the analysis of the received data, the V2I management component 202 can determine a size of a geographical area where the event notification is to be broadcast. For example, for a severe event (e.g., a major accident with long backups), the V2I management component 202 can determine a larger geographical area surrounding the event location, as compared to the geographical area selected for a relatively less severe event (e.g., construction delays, pothole on the road, fender bender, etc.). Further, in another example, based on the analysis of the received data, the V2I management component 202 can determine a priority and/or latency requirement for transmission of the event notification. Furthermore, in yet another example, based on the analysis of the received data, the V2I management component 202 can determine a class (and/or groups of classes) of target IoT devices $102_1$-$102_M$ for which the event notification is intended. For example, the V2I management component 202 can determine that the event notification is intended for connected vehicles, smart city IoT devices, and the like. Alternatively, the V2I management component 202 can determine a class (and/or groups of classes) of devices for which the event notification is not intended.

According to an aspect, in response to determining that other IoT devices are to be notified of the event, the V2I management component 202 can send a request to a broadcast management component 204. As an example, the request can comprise, but is not limited to, event data and/or the determined data (e.g., the coordinates associated with the geographical area where the event notification is to be broadcast, priority of the event, latency attributes of the event, class of the target IoT devices $102_1$-$102_M$, etc.). The broadcast management component 206 can translate the coordinates to a list of radio cell sectors that provide coverage to the geographical area. For example, the broadcast management component 206 can determine access points $112_1$-$112_J$ (e.g., eNBs, femto access points, pico access points, etc.) having respective coverage areas $206_1$-$206_1$ that cover the geographical area. In one aspect, the broadcast management component 206 can determine a message identifier (ID) that is customized based on the priority, latency attributes, and/or class of the target IoT devices $102_1$-$102_M$. It is noted that the subject specification is not limited to the V2I management component 202 determining the priority, latency attributes, and/or class of the target IoT devices $102_1$-$102_M$ and that in some embodiments the broadcast management component 204 can determine this information.

The broadcast management component 204 can then determine control plane entities, for example, mobility management entities (MMEs) 208 that serve the access points $112_1$-$112_J$ and provide a broadcast request to the MMEs 208. As an example, the broadcast request can comprise the message ID, a serial number (e.g., a dynamically generated number that the broadcast management component 204 generates for every new message request it receives), and/or the event data (e.g., additional parameters such as, but not limited to, latency data and/or priority data that can be leveraged by access points to facilitate schedule and/or frequency of SIB transmissions). The MMEs 208 can forward the broadcast request to the corresponding access points $112_1$-$112_J$, which can determine, based on the message ID, that the broadcast request is related to a specific IoT service (e.g., V2V/V2X service). In one aspect, the access points $112_1$-$112_J$ can transmit the event notification/alert via a new SIB that has been dedicated for the specific service. Moreover, all devices served by the access points $112_1$-$112_J$ can receive the event notification/alert. However, in one aspect, a selected class of devices (e.g., mobile phones) can be configured to ignore the event notification/alert while a disparate class of devices can be configured to process/analyze the event notification/alert to perform actions, such as but not limited to, display accident warnings, apply brakes, reduce speed of the vehicle, reroute the vehicle, change traffic light sequence, update digital speed limits, increase/decrease parking payments, and the like, to prevent additional accidents/traffic congestion. Although, the systems and methods disclosed herein are described with reference to crash avoidance within connected vehicles, it is noted that the subject specification is not limited to crash avoidance applications and/or connected vehicles and can be implemented/utilized in various other IoT applications/devices.

Figure 3:
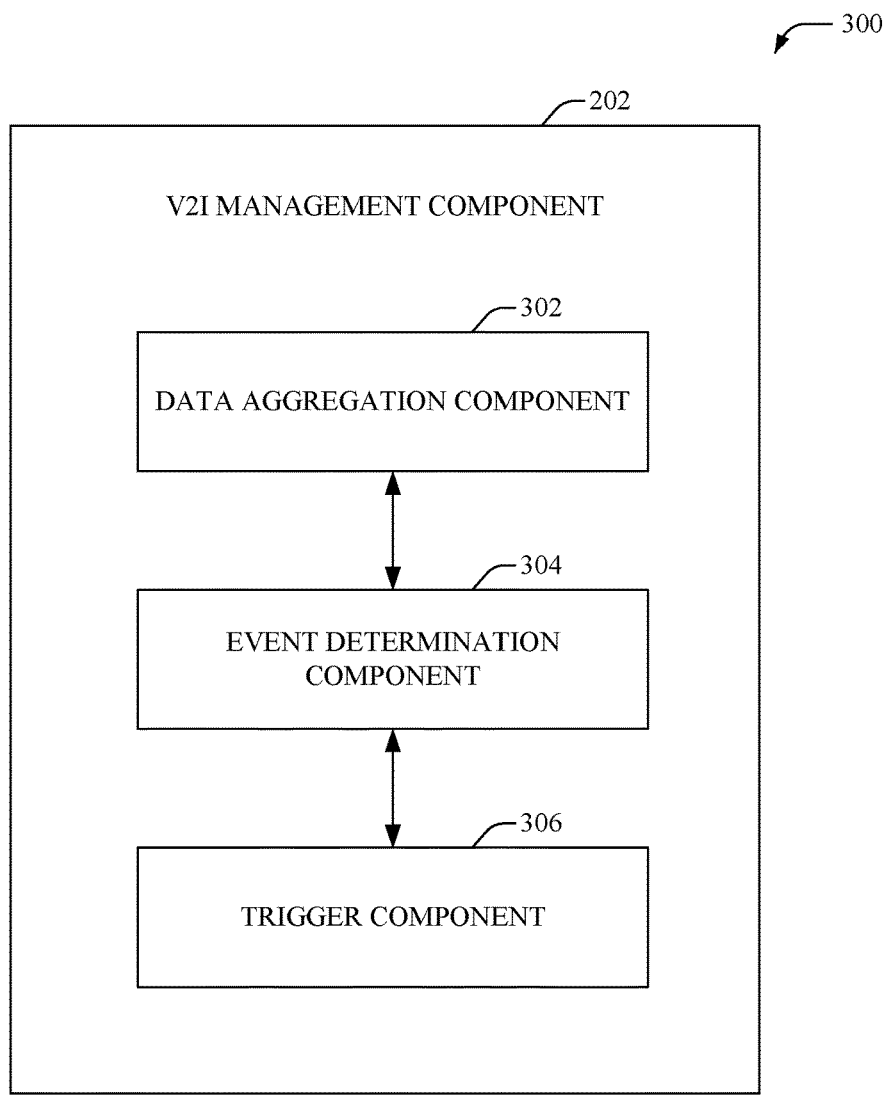
FIG. 3 illustrates is an example system that facilitates vehicle-to-infrastructure (V2I) management, according to an aspect of the subject disclosure.

Referring now to FIG. 3, there illustrated is an example system 300 that facilitates V2I management, according to an aspect of the subject disclosure. It is noted that the V2I management component 202 can include functionality as more fully described herein, for example, as described above with regard to system 200. As an example, the V2I management component 202 can be part of network device(s) (e.g., network devices 108) of a radio access network (RAN) and/or a core mobility network.

In an aspect, the V2I management component 202 can comprise a data aggregation component 302 that is employed to receive messages from one or more user equipment, for example, a connected vehicle, a connected traffic camera, a mobile phone, connected drones (e.g., connected unmanned aircraft or ships), connected submarines and/or ships (e.g., autonomous or otherwise), etc. that are located within a defined region (e.g., within the same cell sector, coupled to a common access point, devices that are located within a defined distance from each other, etc.). The data can include, but is not limited to, an event report that specifies a type of event (e.g., accident, traffic, weather, etc.), measured and/or sensed data (e.g., acceleration, deceleration, speed and/or velocity, temperature, windshield wiper speed, road conditions, etc.), and/or user provided data (e.g., manually entered by a user). In one example, the data can be pushed to the data aggregation component 302, for example, when the event occurs, periodically, when defined communication criteria are met, etc. In another example, the data aggregation component 302 can request for the data on-demand, periodically, in response to determining that event criteria are met, etc. Additionally or optionally, the data aggregation component 302 can receive context information associated with the defined region. As an example, the context information can comprise, but is not limited to, weather conditions within the defined region, news associated with the defined region, traffic reports indicative of backups and/or congestion within the defined region, emergency alerts relating to the defined region, trending data associated with the defined region, and the like.

An event determination component 304 can be utilized to analyze the data received by the data aggregation component 302 to verify a validity of the event and dynamically determine where (e.g., size and/or location of a geographical area surrounding the defined area) the event notification is to be broadcast and/or a class of devices, for which the event notification is intended. Additionally or optionally, the event determination component 304 can dynamically assign, based on an analysis of the data, attributes to the event (e.g., a priority and/or latency requirement). Consider an example scenario wherein a connected car has an accident; the connected car can then report the accident to the data aggregation component 302. In this example scenario, the event determination component 304 can determine a first area where the event notification is to be broadcast, a first class of devices, for which the event notification is intended, and/or assign a first priority and/or first latency requirements for the event. Continuing with the example, if at another time the connected car (or another connected car) sends, to the data aggregation component 302, the same (or substantially similar) report of another accident and the data aggregation component 302 receives similar (or substantially similar) reports from other connected cars that are close to the connected car and/or determines severe weather conditions at the location of the connected car, then the event determination component 304 can determine a second area (e.g., larger than the first area) where the event notification is to be broadcast and/or a second class of devices, for which the event notification is intended (e.g., that is different from the first class of devices), and/or assign a second priority (e.g., greater than the first priority) and second latency requirements (e.g., less than the first latency requirements) for the event. Further, in one aspect, a trigger component 306 can provide the determined data (e.g., by the event determination component 304) to a broadcast management component 204 that can facilitate a transmission of the event notification/alert to devices within the determined area.

Figure 4:
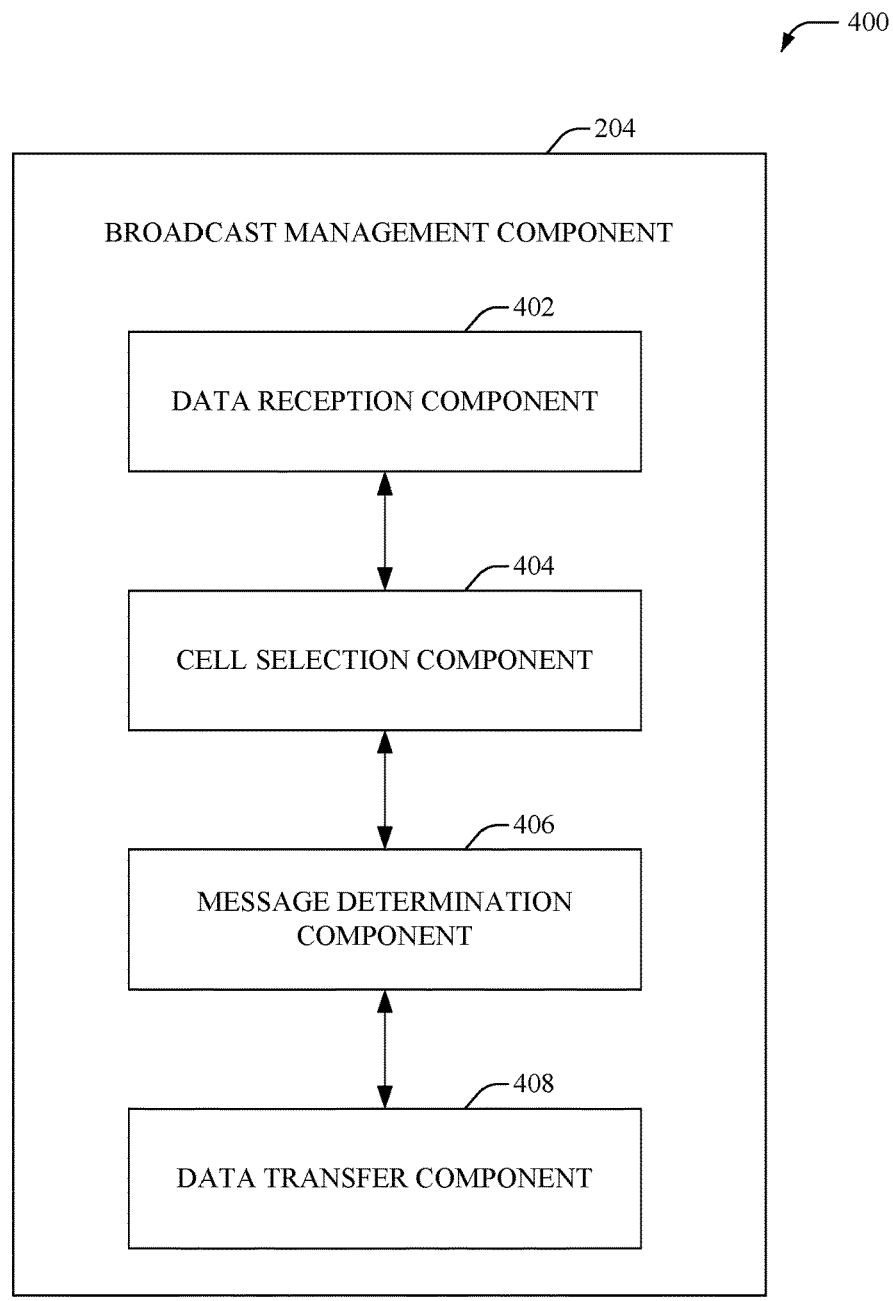
FIG. 4 illustrates an example system that facilitates management of broadcasts for an IoT service.

FIG. 4 illustrates an example system 400 that facilitates management of broadcasts for an IoT service, according to an aspect of the disclosed subject matter. It is noted that the broadcast management component 204 can include functionality as more fully described herein, for example, as described above with regard to system 200. As an example, the broadcast management component 204 can be part of network device(s) (e.g., network devices 108) of a radio access network (RAN) and/or a core mobility network.

In one aspect, a data reception component 402 can receive a message from the V2I management component 202 (e.g., via a push or pull configuration, on demand, in response to an event, periodically, etc.) that comprises event information related to an IoT broadcast service. As an example, the event information can include, but is not limited to, an event type (e.g., accident, traffic, weather, etc.), location of the event, coordinate data representing a geographical area where the event notification is to be broadcast, a class of devices for which the event notification is intended, etc. Additionally or optionally, the event information can include an event priority and/or latency requirements for the notification. It is noted that the event priority and/or latency requirements can be determined by the broadcast management component 204 (e.g., based on an analysis of the event information and/or context information received from network and/or third party servers) in addition to or alternate to the event priority and/or latency requirements being determined by the V2I management component 202.

According to an aspect, a cell selection component 404 can determine, based on the coordinate data, one or more radio cell sectors that map to the geographical area where the event notification is to be broadcast. In one example, based on data stored in a network data store (not shown), the cell selection component 404 can select a set of access points (e.g., femto access points, macro access points, pico access points, etc.) having coverage areas that include the geographical area. Further, in another aspect, a message determination component 406 can generate an appropriate message based on the received event information (and/or determined context data). As an example, a message comprises a message ID and a serial number, wherein the message ID can be customized to uniquely identify parameters and/or delivery preferences (e.g., priority, latency, intended devices, etc.) associated with the message. Moreover, the message determination component 406 can select an appropriate message ID and a serial number and include the (or append the) selected message ID and a serial number within (or to) the event notification/alert. Typically, the event notification/alert can comprise a text message describing the event, location of the event, etc. However, the subject specification is not limited to text messages and most any media/multimedia message can be utilized. In one aspect, a data transfer component 408 can transmit the message to appropriate control plane devices (e.g., MMEs) that serve the selected access points.

Although depicted as residing within the broadcast management component 204, it is noted that the message determination component 406 can reside within the V21 management component 202. In this example embodiment, the event data received by the broadcast management component 204 from the V2I management component 202 can comprise the dynamically selected message ID.

Figure 5:
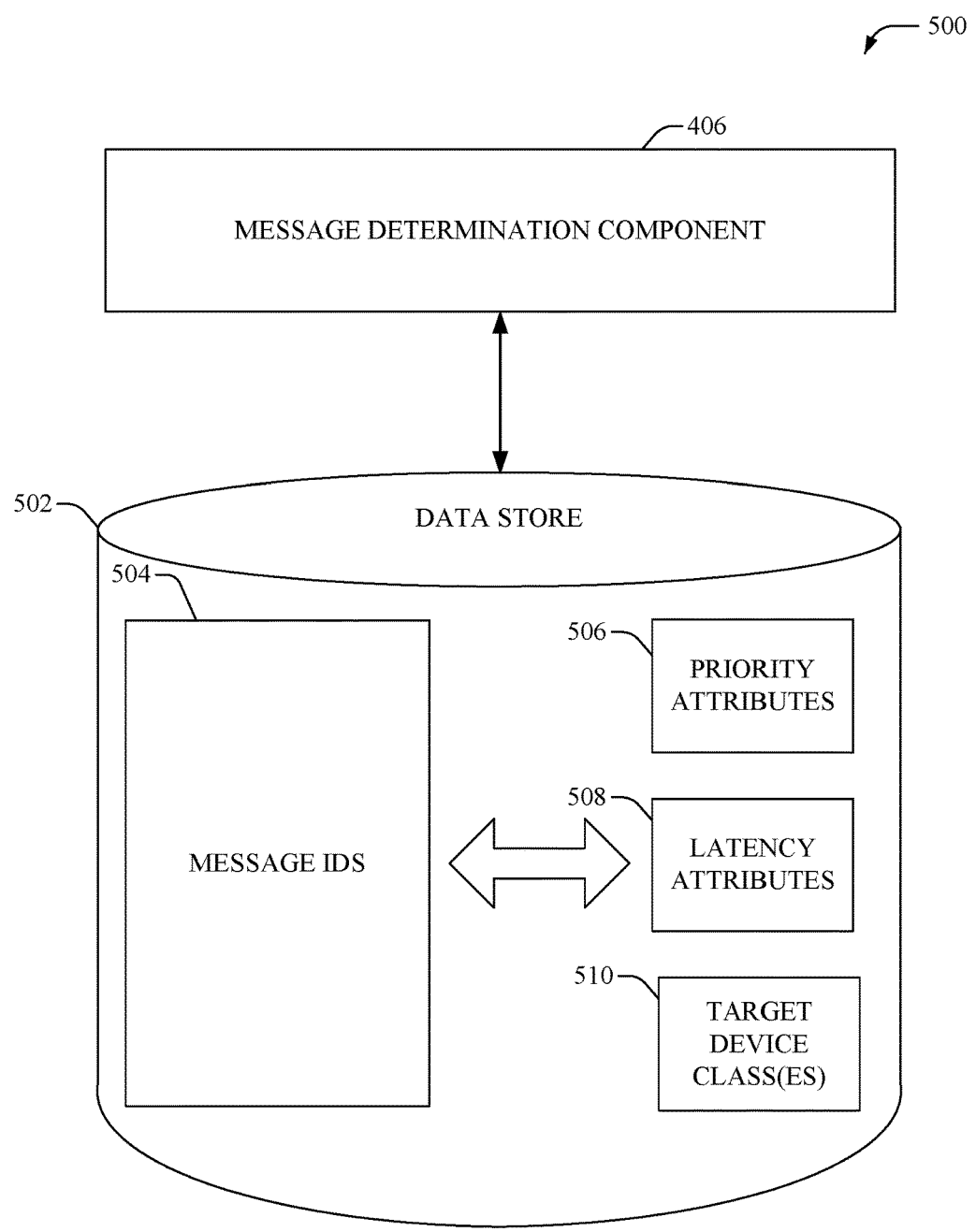
FIG. 5 illustrates an example system that facilitates dynamic message determination for customized IoT service delivery.

Referring now to FIG. 5, there illustrated is an example system 500 that facilitates dynamic message determination for customized IoT service delivery, according to one or more aspects of the disclosed subject matter. It is noted that the message determination component 406 can include functionality as more fully described herein, for example, as described above with regard to system 400. Moreover, the message determination component 406 can be utilized to select an appropriate message ID for customizing delivery of an event notification for an IoT notification service. In one example, a data store 502 can store a mapping of message IDs 504 with different attributes, such as, but not limited to, priority attributes 506, latency attributes 508, target devices classes 510, etc. In one aspect, the mapping can be configured by a network operator and/or service provider and can be modified at most any time. In another aspect, the mapping can be learned by employing most any machine learning technique.

In one example, the message determination component 406 can select a message ID (from message IDs 504) that is mapped to the priority attributes 506 and/or latency attributes 508 that match the priority and/or latency requirement of the notification. For example, for a large multi-car accident, the message determination component 406 can select message ID 1, while for a minor fender-bender accident, the message determination component 406 can select message ID 2, wherein message ID 1 is associated with a higher priority and/or lower latency than message ID 2.

In another example, a specific category of devices (e.g., user equipment (UEs), IoT devices, mobile phones, connected and/or autonomous vehicles, drones, smart city devices, etc.) can be configured to read messages with a specific message ID "X" and in response perform certain actions (e.g., display alert, configure system, record data, control vehicle speed, reroute navigation, etc.). In another example, the specific category of devices can be configured to ignore messages with message ID "Y". Accordingly, if the message is intended for a particular category of devices, the message determination component 406 can select a message ID that the category of devices is configured to process. Alternatively, if the message is not intended for a particular category of devices, the message determination component 406 can select a message ID that the category of devices is configured to ignore. Further, in yet another example, different message IDs can be selected to specify a SIB (e.g., SIB 20, SIB 21, SIB 22, etc.) via which the notification is to be broadcast. For example, connected cars can be configured to only read SIB 20, while some other IoT devices would be configured to read SIB 21, and/or SIB 22. This approach can separate the traffic and ensure that a specific category of devices is not burdened with unnecessary traffic targeted for a different category of devices. In one aspect, a serving access point (of access points 112) can comprise a mapping that maps message IDs to SIBs. In another aspect, the SIB value can be transmitted to the access point by the broadcast management component 204 via an interface between the broadcast management component 204 and the access point. As an example, when the message it to be targeted to connected cars, the broadcast management component 204 can transmit a message that comprises not only the message ID but also the SIB value indicative of an SIB that is to be utilized by the access point to broadcast the message. The SIB each device type reads can be coded into the device (e.g., during manufacture) and/or can be configured and/or updated at most any time (e.g., via over-the-air updates provided by a network operator).

Additionally or alternatively, the message determination component 406 can include the attributes 506-510, as additional parameters on top of Message ID, within the message that is provided to the access points. In one aspect, the access point can analyze the additional parameters to dynamically schedule SIB frequency for each new broadcast message in order to meet different latency requirements. For example, if an access point receives message request 1 that contains text size=X bytes and required latency=3s then it can dynamically adjust a SIB (e.g., SIB 20) periodicity level to a value that would enable the access point repeat SIB 20 frequent enough to transmit all X bytes of message 1 within 3s.

Typically, the data store 502 can be a network data store that is part of and/or coupled to the V2I management component 202 and/or the broadcast management component 204. Further, it is noted that the data store 502 can include volatile memory(s) or nonvolatile memory(s), or can include both volatile and nonvolatile memory(s). Examples of suitable types of volatile and non-volatile memory are described below with reference to FIG. 10. The memory (e.g., data stores, databases) of the subject systems and methods is intended to include, without being limited to, these and any other suitable types of memory.

Figure 6A:
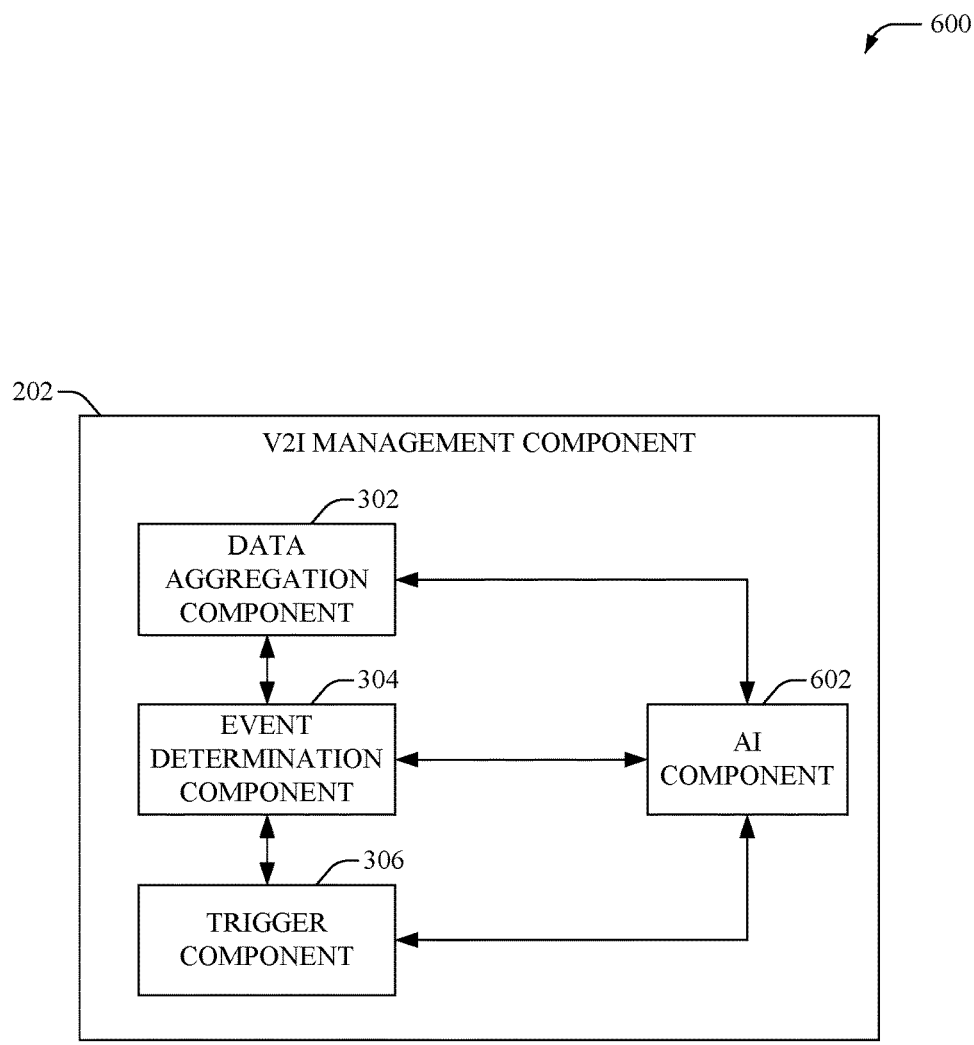
FIGS. 6A and 6B illustrate example systems that facilitate automating one or more features in accordance with the subject embodiments.
Figure 6B:
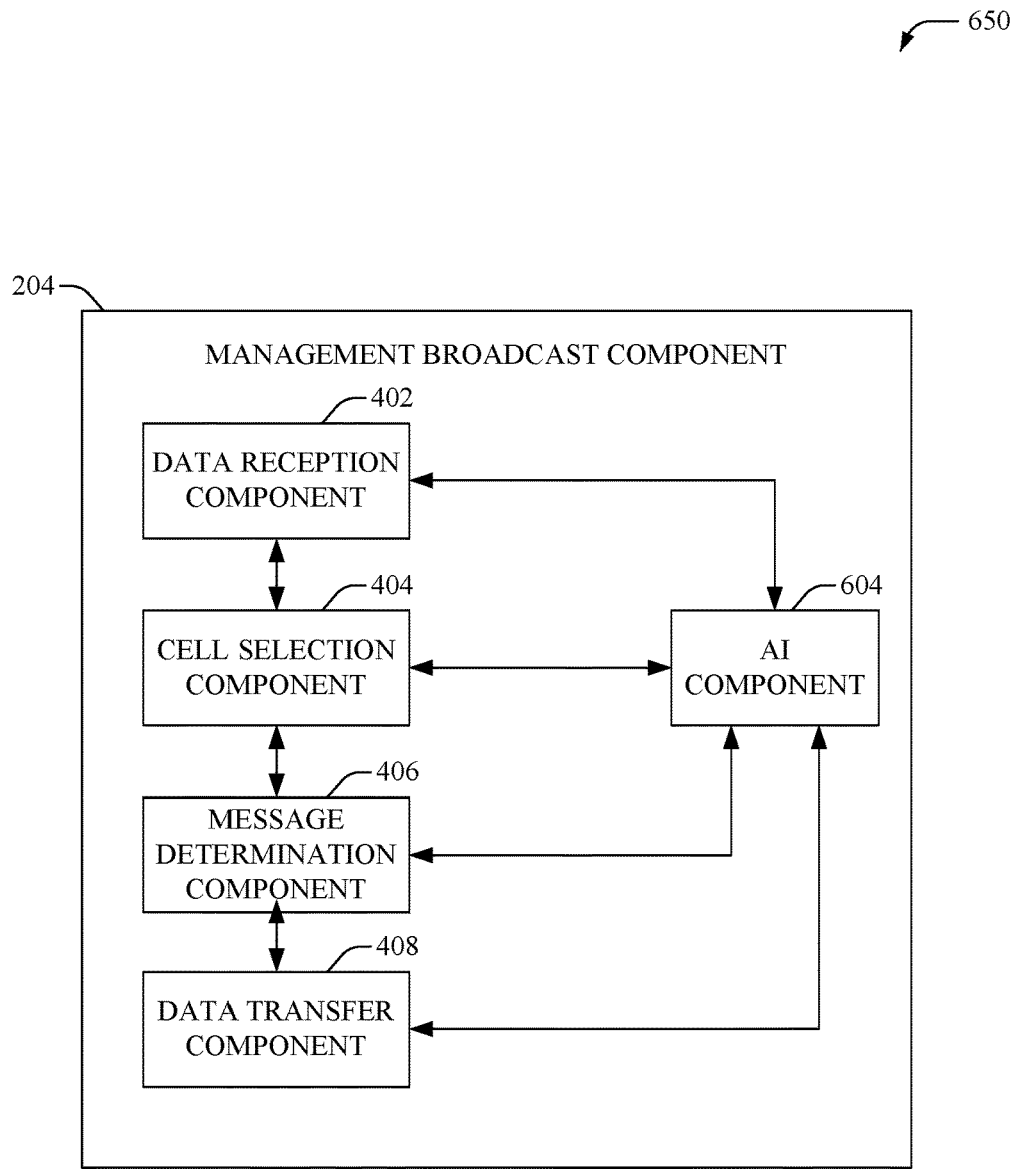

Referring now to FIGS. 6A and 6B, there illustrated is are example systems (600, 650) that employ artificial intelligence (AI) components (602, 604) to facilitate automating one or more features in accordance with the subject embodiments. It is noted that the V2I management component 202, broadcast management component 204, data aggregation component 302, event determination component 304, trigger component 306, data reception component 402, cell selection component 404, message determination component 406, and data transfer component 408 can include functionality as more fully described herein, for example, as described above with regard to systems 200-500.

In an example embodiment, systems 600 and 650 (e.g., in connection with automatically determining attributes related to IoT broadcast service delivery) can employ various AI-based schemes (e.g., intelligent processing/analysis, machine learning, etc.) for carrying out various aspects thereof. For example, a process for determining where and/or when to broadcast the notification/alert, target devices and/or class of devices that the notification/alert is intended for, a priority and/or latency attribute for delivery of the notification/alert, etc. can be facilitated via an automatic classifier system implemented by AI components 602 and/or 604. Moreover, the AI components 602 and 604 can various exploit artificial intelligence (AI) methods or machine learning methods. Artificial intelligence techniques can typically apply advanced mathematical algorithms—e.g., decision trees, neural networks, regression analysis, principal component analysis (PCA) for feature and pattern extraction, cluster analysis, genetic algorithm, or reinforced learning—to a data set. In particular, AI components 602 and 604 can employ one of numerous methodologies for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Further, advanced AI and mathematical techniques can be employed to analyze the efficiency of each data link (physical and virtual) to determine the proportion of the data that is to be sent through each link to maximize (or increase) data transport efficiency.

As will be readily appreciated from the subject specification, an example embodiment can employ classifiers that are explicitly trained (e.g., via a generic training data) as well as implicitly trained (e.g., via observing vehicle motion, vehicle behavior, user/operator preferences, historical information, receiving extrinsic information, type of vehicle, type of sensors, etc.). For example, SVMs can be configured via a learning or training phase within a classifier constructor and feature selection module. Thus, the classifier(s) of AI components 602 and/or 604 can be used to automatically learn and perform a number of functions, including but not limited to determining according to a predetermined criteria, a type of event, an event severity, a location and/or size of an area where the notification/alert is to be broadcast, a category of devices that are configured to utilize the notification/alert to perform actions, an event priority, latency attributes related to delivery of the notification/alert, a message ID, a dedicated SIB which is to be utilized to broadcast the notification/alert, etc. The criteria can include, but is not limited to, historical patterns and/or trends, device behavior, user preferences, service provider preferences and/or policies, location of the event, current time/date, weather conditions, news, scheduled events within the area (e.g., concerts, parades, political rallies, football games, etc.) and the like.

Figure 7:
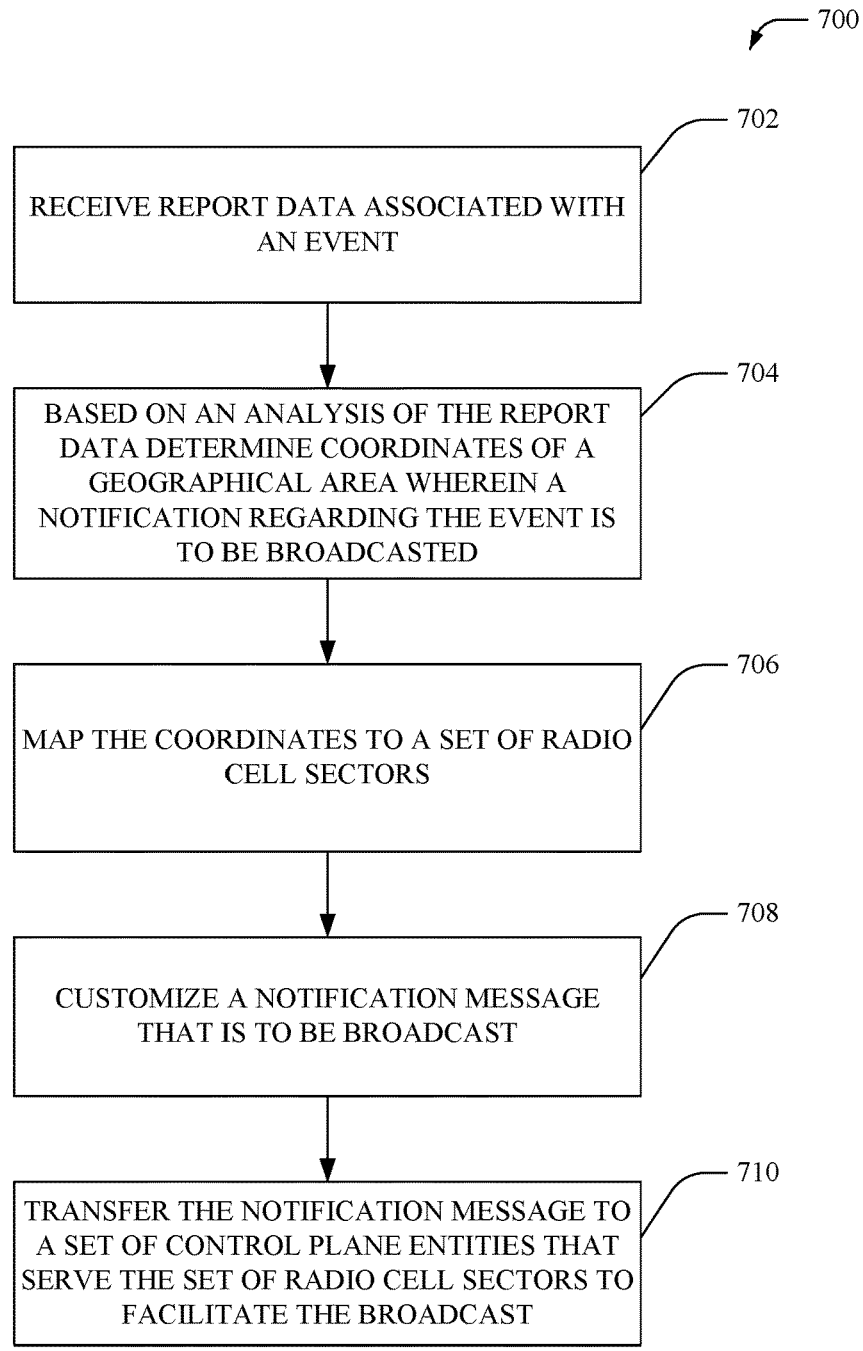
FIG. 7 illustrates an example method that facilitates data broadcast to IoT devices.
Figure 8:
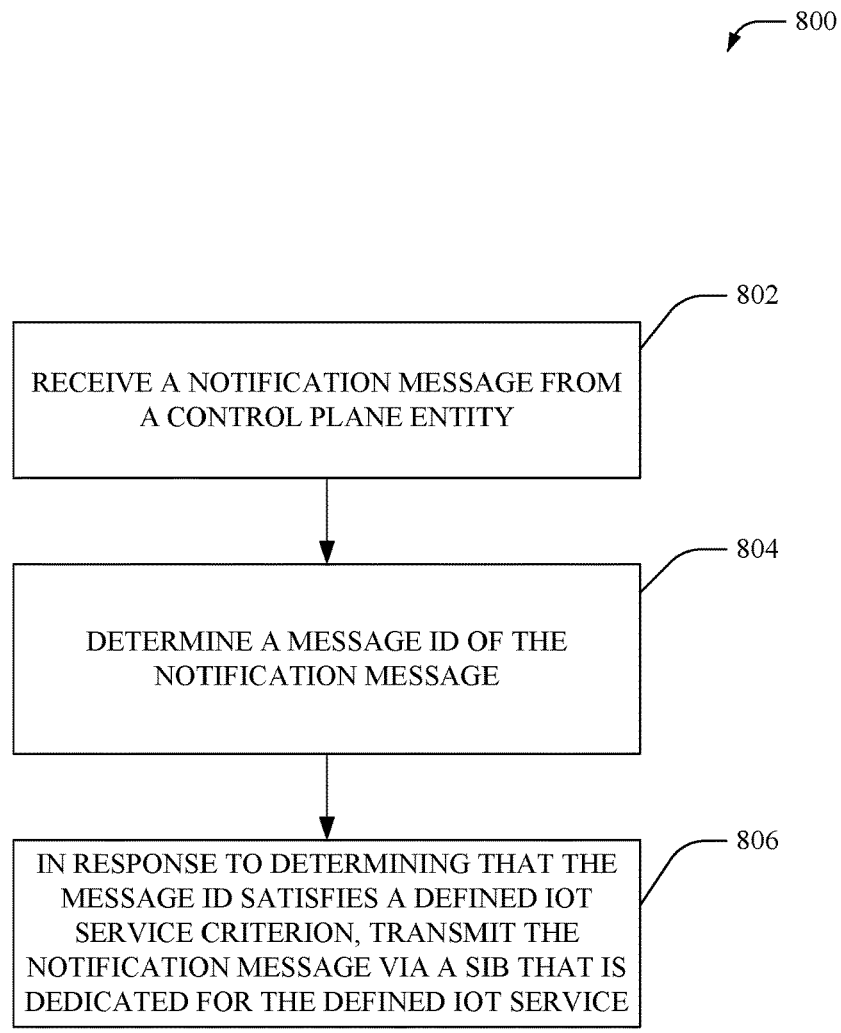
FIG. 8 illustrates an example method that facilitates transmission of notification data via a SIB that has been dedicated for IoT service delivery.

FIGS. 7-8 illustrate flow diagrams and/or methods in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 7, illustrated is an example method 700 that facilitates data broadcast to IoT devices, according to an aspect of the subject disclosure. As an example, method 700 can be implemented by one or more network devices of a communication network (e.g., cellular network). At 702, report data associated with an event can be received, for example, from one or more devices (e.g., connected vehicles, IoT devices, smart phones, activity trackers, sensors, drones, etc.) within a region. As an example, the report can comprise but is not limited to error conditions, accident-related data, vehicle operation data, sensor data, traffic conditions, road conditions, malfunction data, etc. Moreover, the report can be generated and transmitted automatically (e.g., in response to determining that the event has occurred) and/or can be provided manually by a user. At 704, based on an analysis of the report data, coordinates of a geographical area (e.g., surrounding the region, in close proximity to the region, a part of the region, etc.) wherein a notification regarding the event is to be broadcast is determined. Additionally or optionally, context data (e.g., weather conditions, news, scheduled event information, etc.) related to the region received from network and/or third party servers (not shown) can also be utilized to determine the coordinates. At 706, the coordinates can be mapped to a set of radio cell sectors.

In one aspect, attributes related to delivery of the notification, such as but not limited to, priority, latency, and/or target destination devices, etc. can be determined. At 708, a notification message that is to be broadcast can be customized, for example, based on the determined attributes. In one example, an appropriate message ID can be selected for the notification message based on the determined attributes. Further, at 710, the notification message can be transferred to a set of control plane entities that serve the set of radio cell sectors to facilitate the broadcast. Moreover, in one example, based on the message ID, access points associated with the radio cell sectors can transmit the notification message via a new SIB that is reserved for IoT service delivery and that is not utilized to transmit communication associated with other services (e.g., WEA).

FIG. 8 illustrates an example method 800 that facilitates transmission of notification data via a SIB that has been dedicated for IoT service delivery, according to an aspect of the subject disclosure. As an example, the method 800 can be implemented at least in part by an access point (e.g., a macro access point, femto access point, pico access point, etc.). At 802, a notification message can be received from a control plane entity (e.g., MME). As an example, the notification message is generated in response to receiving, from one or more devices within a region, information reporting an event (e.g., accident, traffic congestion, road closure, etc.). At 804, a message ID of the message can be determined. As an example, the message ID can be part of a header of the message and/or can be appended to the message. Further, at 806, in response to determining that the message ID satisfies a defined IoT service criteria (e.g., matches a range of IDs reserved for V2V/V2X service), the notification message can be transmitted via a SIB that is dedicated for the defined IoT service. As an example, the SIB can be transmitted over a U-u radio interface in the BCCH logical channel. Typically, BCCH messages are carried on the DL-SCH and transmitted on the PDSCH. The SIB (e.g., SIB 20) utilized to transmit the notification data can be assigned to carry broadcast data that targets one or more classes of destination IoT devices in a selected area. In one aspect, the message ID can be utilized to prioritize the transmission of the notification message.

Figure 9:
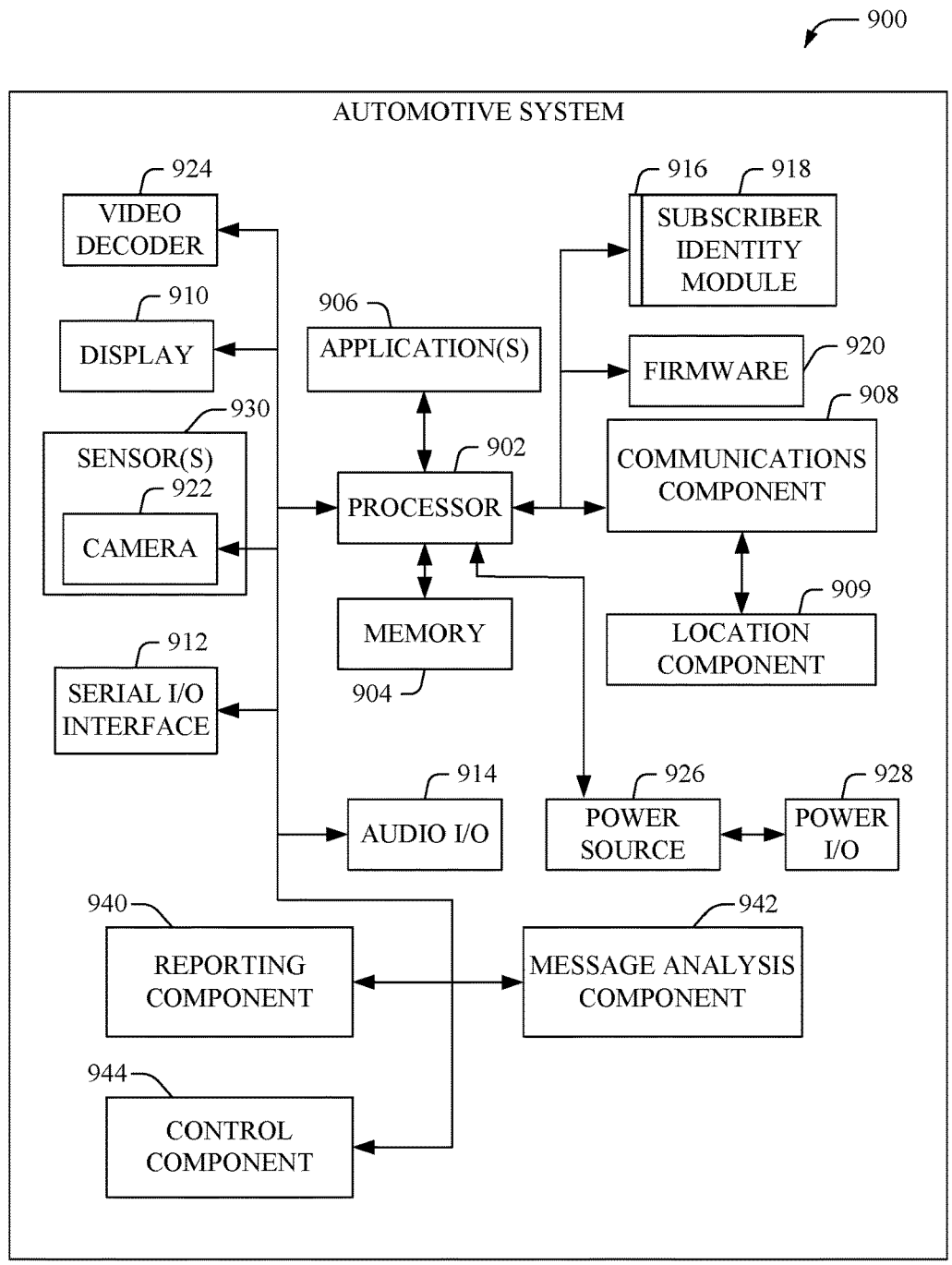
FIG. 9 an example block diagram of an automotive system utilized by connected cars to facilitate a vehicle-to-vehicle and/or a vehicle-to-everything service.

Referring now to FIG. 9, there is illustrated a block diagram of an automotive system 900 utilized by connected cars to facilitate a V2V and/or V2X service in accordance with the subject specification. Moreover, the target IoT devices 102 and $102_1$-$102_M$, source IoT devices 110 and $110_1$-$110_M$, can include at least a portion of the automotive system 900. In one aspect, the automotive system 900 can include a processor 902 for controlling all onboard operations and processes. A memory 904 can interface to the processor 902 for storage of data and one or more applications 906 being executed by the processor 902. A communications component 908 can interface to the processor 902 to facilitate wired/wireless communication with external systems (e.g., other vehicles, access points, network servers, etc.). The communications component 908 can interface to a location component 909 (e.g., GPS transceiver) that can facilitate location detection of the automotive system 900.

The automotive system 900 can include a display 910 for displaying received content (and/or content to be transferred) and/or for displaying text information related to operating and using the device features. In one example, the display can include a factory installed heads-up display (HUD) and/or after-market connected devices such as on-board diagnostics II (OBD2) and/or a head unit that is not factory installed. A serial I/O interface 912 is provided in communication with the processor 902 to facilitate serial communication (e.g., USB, and/or IEEE 1194) via a hard-wire connection. Audio capabilities are provided with an audio I/O component 914, which can include a speaker for the output of audio signals related to, for example, recorded data or telephony voice data, and a microphone for inputting voice commands.

Additionally or optionally, the automotive system 900 can include a slot interface 916 for accommodating a subscriber identity module (SIM) 918 that is employed to authenticate the automotive system 900 with a network (e.g., cellular network). Firmware 920 is also provided to store and provide to the processor 902 startup and operational data. The automotive system 900 can also include sensors 930 comprising a camera 922 and/or a video decoder 924 for decoding encoded multimedia content. Further, the automotive system 900 can include a power source 926 in the form of batteries, which power source 926 can interface to an external power system or charging equipment via a power I/O component 928.

In one aspect, the automotive system 900 can comprise a reporting component 940 that generates report data in response to determining that an event has occurred (and/or is taking place). As an example, the reporting component 940 can employ data received from the sensors 930 and/or instructions provided by a user (e.g., via the serial I/O interface 912) to determine occurrence of the event. Moreover, the communications component 908 can transmit the report data to a V2I management component 202 for example via a RAN.

Further, in one aspect, the communications component 908 can receive a notification message transmitted from a RAN via a SIB that is dedicated for IoT broadcast service. According to an embodiment, a message analysis component 942 can evaluate the notification message and determine whether the message is to be ignored or further processed, for example, based on a message ID of the notification message. In one example, the automotive system 900 can be configured to ignore messages with a specific set of message IDs and/or perform actions in response to receiving messages with another specific set of message IDs. Typically, this configuration can be stored within memory 904. In one aspect, a control component 944 can be utilized to control operations of the automotive system 900 based on an analysis of the notification message. In one example, the control component 944 can present the notification message via the display 910, serial I/O interface 912, and/or audio I/O 914 (e.g., to alert the user regarding the event). In another example, the control component 944 can provide the notification message to applications 906, for example, a navigation application to modify a route (e.g., to avoid the event location). In yet another example, the control component 944 can control various functions of the automotive system 900, such as, but not limited to, speed, acceleration, braking, steering, gear shifting, ignition, etc. Further, the control component 944 can manage system such as, but not limited to, a navigation system, a climate control system, a media system, and/or other functions (e.g., power windows, power locks, convertible top, sunroof, moon roof, seat adjustment controls, etc.) and/or safety features of the automotive system.

Figure 10:
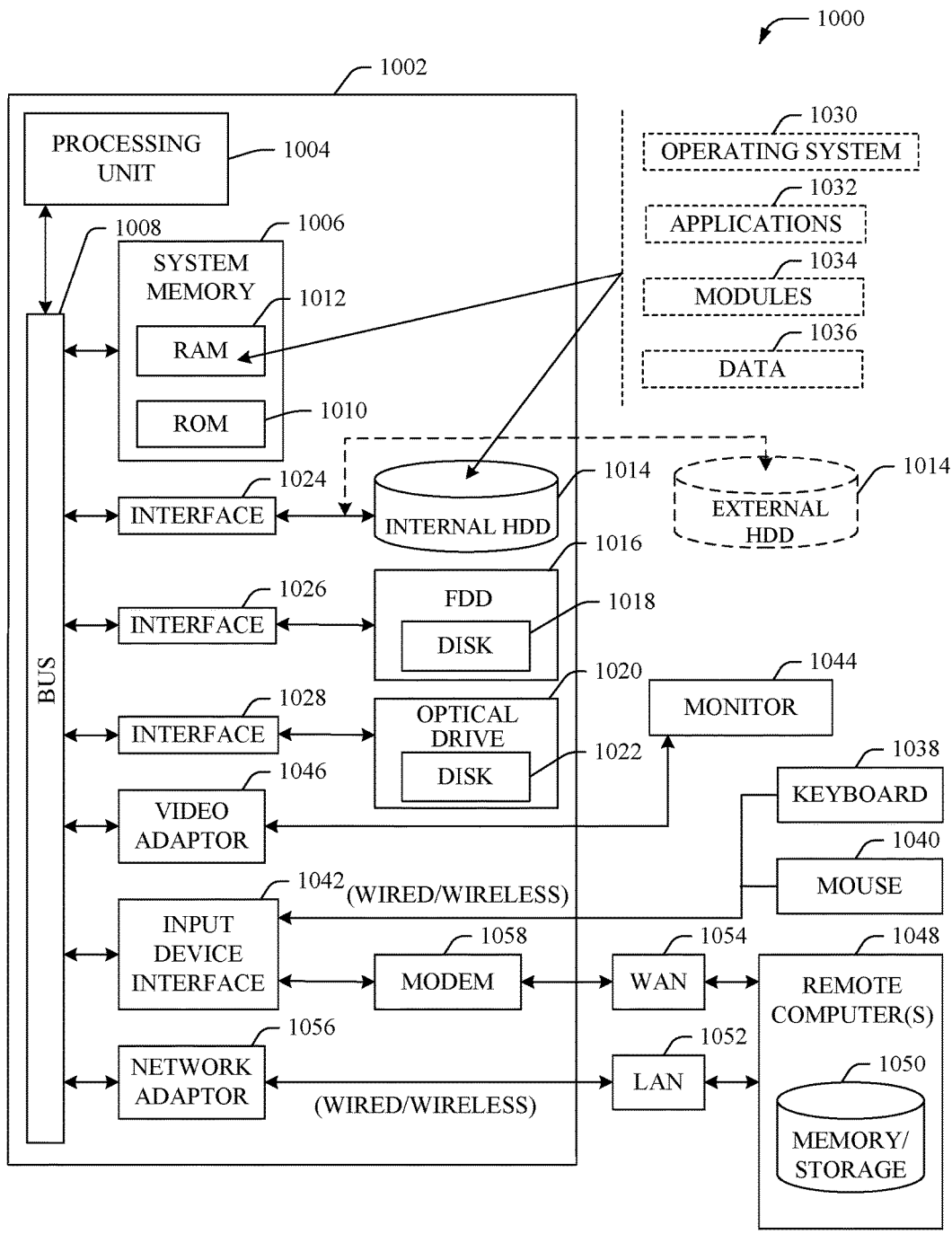
FIG. 10 illustrates a block diagram of a computer operable to execute the disclosed communication architecture.

Referring now to FIG. 10, there is illustrated a block diagram of a computer 1002 operable to execute the disclosed communication architecture. In order to provide additional context for various aspects of the disclosed subject matter, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

With reference again to FIG. 10, the example environment 1000 for implementing various aspects of the specification includes a computer 1002, the computer 1002 including a processing unit 1004, a system memory 1006 and a system bus 1008. As an example, the component(s), server(s), equipment, system(s), interface(s), vehicle(s), thing(s), and/or device(s) (e.g., target IoT devices 102 and 102$_1$-102$_M$, communication network 104, network devices 108, source IoT devices 110 and 110$_1$-110$_M$, access points 112 and 112$_1$-112$_J$, V2I management component 202, broadcast management component 204, MME 208, data aggregation component 302, event determination component 304, trigger component 306, data reception component 402, cell selection component 404, message determination component 406, data transfer component 408, data store 502, AI components 602 and 604, automotive system 900, communications component 908, location component 909, reporting component 940, message analysis component 942, control component 944, etc.) disclosed herein with respect to systems 100-650 and 900 can each include at least a portion of the computer 1002. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014, which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and/or a pointing device, such as a mouse 1040 or a touchscreen or touchpad (not illustrated). These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc. A monitor 1044 or other type of display device is also connected to the system bus 1008 via an interface, such as a video adapter 1046.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., desktop and/or portable computer, server, communications satellite, etc. This includes at least WiFi and Bluetooth™ wireless technologies or other communication technologies. Thus, the communication can be a predefined structure as with a conventional network or simply an ad hoc communication between at least two devices.

WiFi, or Wireless Fidelity networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 11:
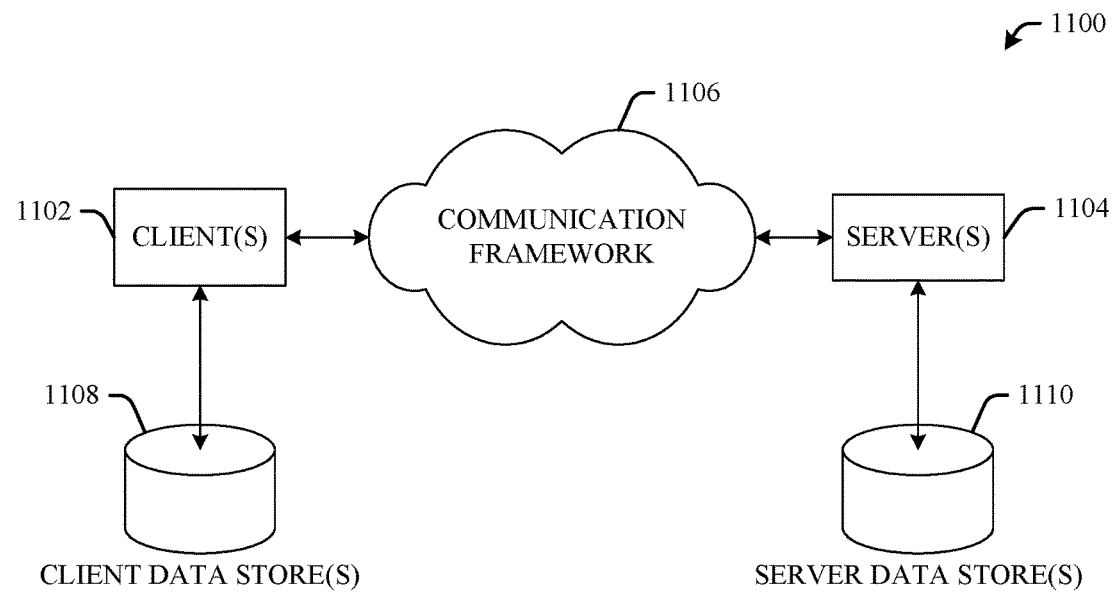
FIG. 11 illustrates a schematic block diagram of a computing environment in accordance with the subject specification.

Referring now to FIG. 11, there is illustrated a schematic block diagram of a computing environment 1100 in accordance with the subject specification. The system 1100 includes one or more client(s) 1102. The client(s) 1102 can be hardware and/or software (e.g., threads, processes, computing devices).

The system 1100 also includes one or more server(s) 1104. The server(s) 1104 can also be hardware and/or software (e.g., threads, processes, computing devices). The servers 1104 can house threads to perform transformations by employing the specification, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        receiving, from a first user equipment, report data associated with an event;
        based on an analysis of the report data, determining a geographical area where notification data related to the event is to be broadcast;
        facilitating a transmission of the notification data via an access point device that is determined to have a coverage area that comprises a portion of the geographical area, wherein the notification data is to be transmitted via a system information block that has been dedicated to transfer Internet of things service data, and wherein the system information block is to be transmitted via a radio interface in a broadcast control channel; and
        configuring a second user equipment located within the geographical area and served by the access point device to read the system information block.

2. The system of claim 1, wherein the first user equipment comprises a connected vehicle and the Internet of things service data comprises vehicle-to-everything service data.

3. The system of claim 1, wherein the determining comprises determining the geographical area based on context data associated with a location of the first user equipment.

4. The system of claim 3, wherein the context data comprises weather data indicative of a weather condition associated with the location.

5. The system of claim 1, wherein the first user equipment is located within a region, the report data is first report data, and wherein the determining comprises determining the geographical area based on second report data associated with the event that has been received from a third user equipment located within the region.

6. The system of claim 1, wherein the determining comprises determining the geographical area based on category data indicative of a category of the event.

7. The system of claim 1, wherein the operations further comprise:
    based on the analysis, determining class data indicative of a class of Internet of things devices for which the notification data is intended; and
    based on the class data, selecting a message identifier for the notification data, wherein devices that do not belong to the class have been configured to ignore broadcast information that comprises the message identifier.

8. The system of claim 1, wherein the operations further comprise:
    based on the analysis, determining priority data indicative of a priority associated with the transmission of the notification data; and
    based on the priority data, selecting a message identifier for the notification data.

9. The system of claim 1, wherein the operations further comprise:
    based on the analysis, determining latency data indicative of a latency attribute associated with the transmission of the notification data; and
    based on the latency data, selecting a message identifier for the notification data.

10. The system of claim 1, wherein the report data comprise sensor data related to a sensor of the first user equipment.

11. The system of claim 1, wherein the second user equipment is an internet of things device located within the geographical area and served by the access point device.

12. A method, comprising:
based on analyzing report data that is associated with an event and that has been received from a user equipment, selecting, by a system comprising a processor, a geographical area where a notification message related to the event is to be broadcast;
determining, by the system, a network device that serves an Internet of things device located within the geographical area;
facilitating, by the system, a broadcast of the notification message via the network device, wherein the notification message is to be broadcast via a system information block that is reserved to transfer Internet of things service data via a radio interface in a broadcast control channel; and
configuring, by the system, a chipset within the Internet of things device to ignore the system information block.

13. The method of claim 12, further comprising:
based on analyzing the report data, determining, by the system, class data indicative of a class of Internet of things devices for which the notification message is intended; and
based on the class data, selecting, by the system, identifier data indicative of an identifier associated with the notification message, wherein devices that do not belong to the class have been configured to ignore broadcast information that comprises the identifier data.

14. The method of claim 12, further comprising:
based on analyzing the report data, determining, by the system, priority data indicative of a priority associated with the broadcast; and
based on the priority data, selecting, by the system, identifier data indicative of an identifier associated with the notification message.

15. The method of claim 12, further comprising:
based on analyzing the report data, determining, by the system, latency data indicative of a latency attribute associated with the broadcast; and
based on the latency data, selecting, by the system, identifier data indicative of an identifier associated with the notification message.

16. The method of claim 12, wherein the selecting the geographical area comprises selecting a region that has been determined to satisfy a proximity criterion associated with a location of the user equipment.

17. A non-transitory machine-readable storage medium, comprising executable instructions that, when executed by a processor, facilitate performance of operations, comprising:
receiving, from a control plane device, alert data that has been generated based on report data received from a first internet of things device, wherein the report data is indicative of an event associated with the first internet of things device;
determining identifier data associated with the alert data;
based on an analysis of the identifier data, facilitating a transfer of the alert data to a second internet of things device via a system information block that has been dedicated to transfer information associated with an Internet of things service, wherein the system information block is to be transmitted via a radio interface of a broadcast control channel; and
configuring the second internet of things device to read or not read the system information block.

18. The non-transitory machine-readable storage medium of claim 17, wherein the operations further comprise:
based on the analysis, determining priority data indicative of a priority associated with the transfer; and
based on the priority data, prioritizing the transfer.

19. The non-transitory machine-readable storage medium of claim 17, wherein the operations further comprise:
modifying a frequency of transmissions performed via the system information block.

20. The non-transitory machine-readable storage medium of claim 17, wherein the facilitating comprises facilitating the transfer in response to determining that the identifier data specifies that the alert data is related to the Internet of things service.

* * * * *